US009082426B1

(12) United States Patent
Chen et al.

(10) Patent No.: US 9,082,426 B1
(45) Date of Patent: Jul. 14, 2015

(54) METHODS FOR MANUFACTURING ELECTRONIC LAPPING GUIDES FOR WRITER HEADS THAT CLOSELY TRACK POLE FORMATION OF THE WRITER HEADS

(71) Applicant: Western Digital (Fremont), LLC, Fremont, CA (US)

(72) Inventors: Yan Chen, Fremont, CA (US); Donghong Li, Pleasanton, CA (US); Ronghui Zhou, Fremont, CA (US); Lien-Chang Wang, Fremont, CA (US); Lily Yao, Hayward, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 398 days.

(21) Appl. No.: 13/719,809

(22) Filed: Dec. 19, 2012

(51) Int. Cl.
| H04R 31/00 | (2006.01) |
| G11B 5/127 | (2006.01) |
| G11B 5/31 | (2006.01) |
| B24B 49/10 | (2006.01) |
| G11B 5/39 | (2006.01) |
| B24B 37/04 | (2012.01) |

(52) U.S. Cl.
CPC .............. *G11B 5/127* (2013.01); *B24B 37/04* (2013.01); *B24B 49/10* (2013.01); *G11B 5/31* (2013.01); *G11B 5/315* (2013.01); *G11B 5/3116* (2013.01); *G11B 5/39* (2013.01); *H04R 31/00* (2013.01); *Y10T 29/49039* (2015.01); *Y10T 29/49043* (2015.01); *Y10T 29/49044* (2015.01); *Y10T 29/49046* (2015.01); *Y10T 29/49048* (2015.01); *Y10T 29/49052* (2015.01)

(58) Field of Classification Search
CPC ................... Y10T 29/49039; Y10T 29/49044; Y10T 29/49043; Y10T 29/49052; Y10T 29/49046; Y10T 29/49048; H04R 31/00; G11B 5/39; G11B 5/31; G11B 5/3116; G11B 5/1278; G11B 5/3163; G11B 5/315; G11B 5/127; B24B 37/04; B24B 49/04; B24B 49/10
USPC ................. 29/603.16, 603.07, 603.01, 592.1, 29/603.09, 603.1, 603.13, 603.14, 603.15, 29/603.18; 360/121, 122, 317, 318, 313; 451/5, 41; 324/671, 691; 427/10, 9, 8, 427/128; 216/39, 41, 48, 86, 84, 61
See application file for complete search history.

(56) References Cited

U.S. PATENT DOCUMENTS

| 6,193,584 | B1 * | 2/2001 | Rudy et al. ................. 451/5 |
| 7,770,281 | B2 * | 8/2010 | Pentek ................. 29/603.12 |
| 8,018,678 | B1 * | 9/2011 | Zhang et al. ............. 360/125.03 |
| 8,082,657 | B2 | 12/2011 | Lee et al. |
| 8,082,658 | B2 * | 12/2011 | Boone et al. ............. 29/603.09 |
| 8,161,627 | B2 | 4/2012 | Bonhote et al. |
| 8,225,488 | B1 * | 7/2012 | Zhang et al. ............. 29/603.16 |
| 8,230,583 | B2 * | 7/2012 | Lille ................. 29/603.16 |

(Continued)

*Primary Examiner* — Peter DungBa Vo
*Assistant Examiner* — Azm Parvez

(57) ABSTRACT

Methods for manufacturing electronic lapping guides (ELGs) for writer heads that closely track the pole formation of the writer heads are provided. Once such method includes forming an ELG adjacent to a writer head that is subjected to substantially all of the sub-processing actions associated with the pole formation of the writer head, lapping the pole material, measuring a resistance of the ELG during the lapping, comparing the measured resistance with a target resistance, and terminating the lapping based on the comparison of the measured resistance with the target resistance.

18 Claims, 7 Drawing Sheets

(56) References Cited

U.S. PATENT DOCUMENTS

| | | | |
|---|---|---|---|
| 8,443,510 B1* | 5/2013 | Shi et al. | 29/603.16 |
| 8,533,937 B1* | 9/2013 | Wang et al. | 29/603.14 |
| 8,758,083 B1* | 6/2014 | Rudy et al. | 451/5 |
| 2009/0152235 A1* | 6/2009 | Hsiao et al. | 216/22 |
| 2013/0001187 A1* | 1/2013 | Le et al. | 216/16 |

* cited by examiner

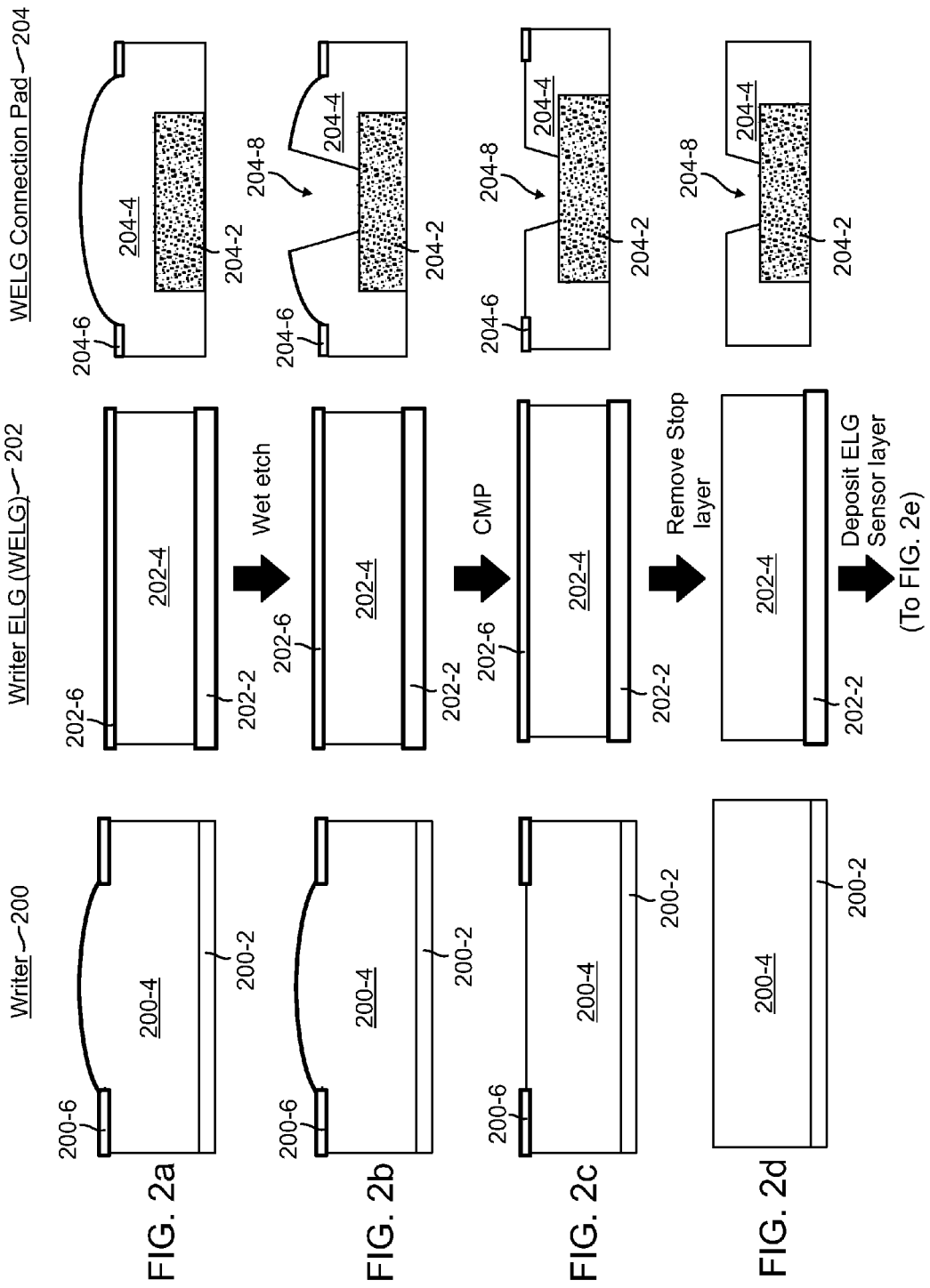

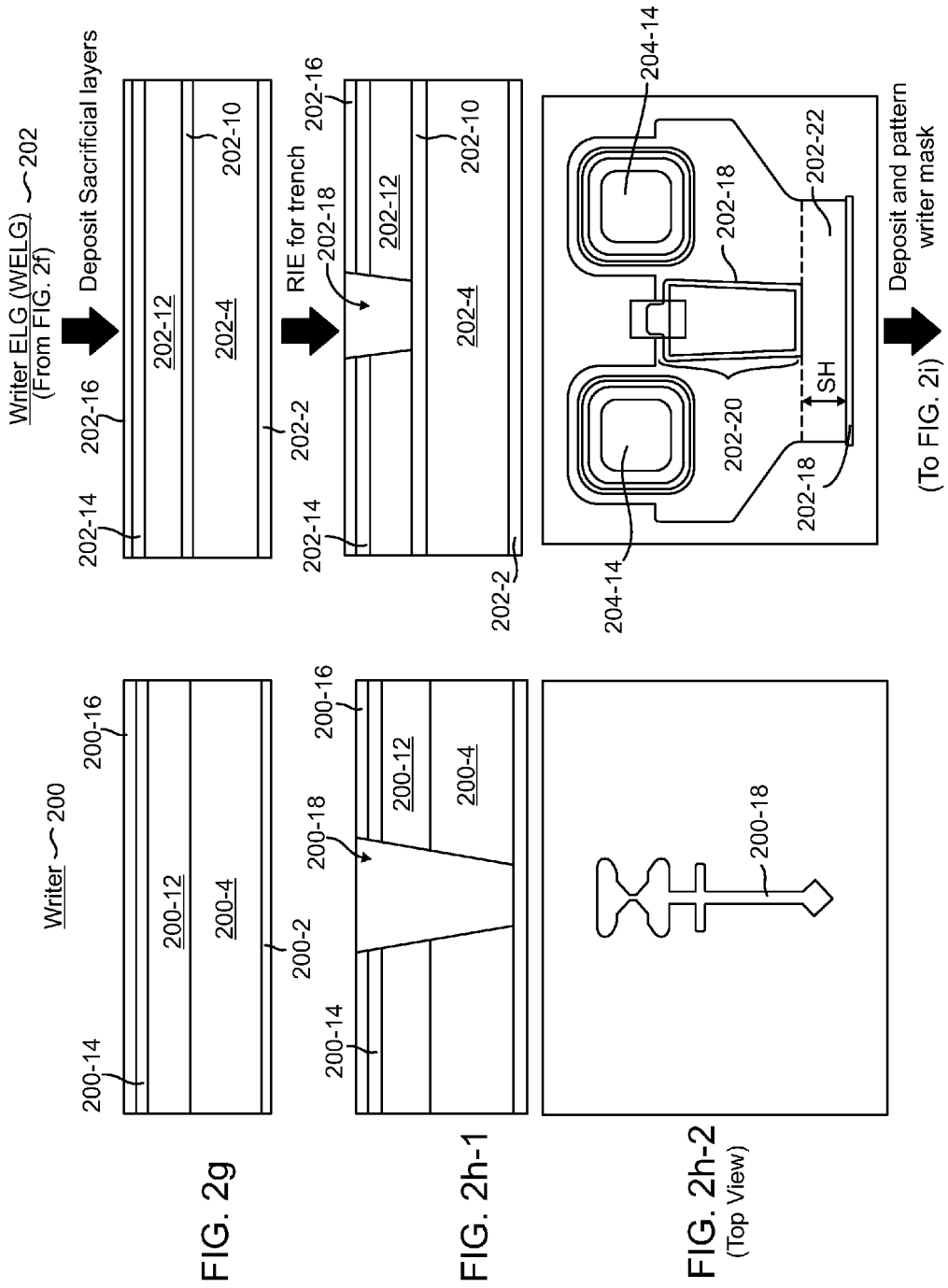

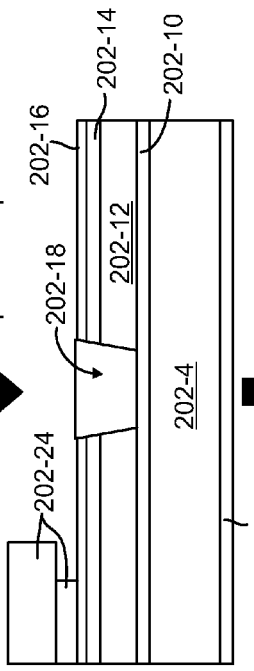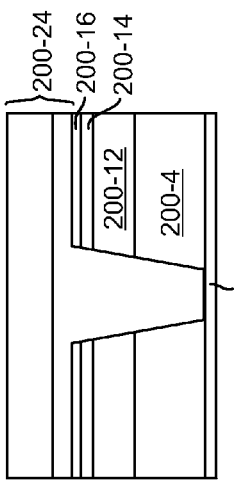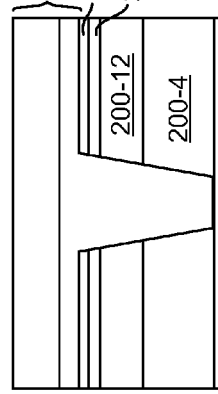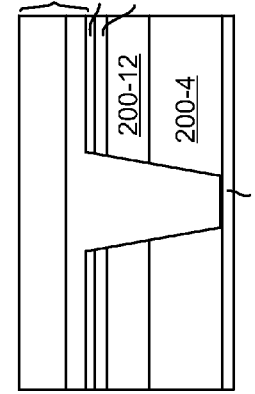

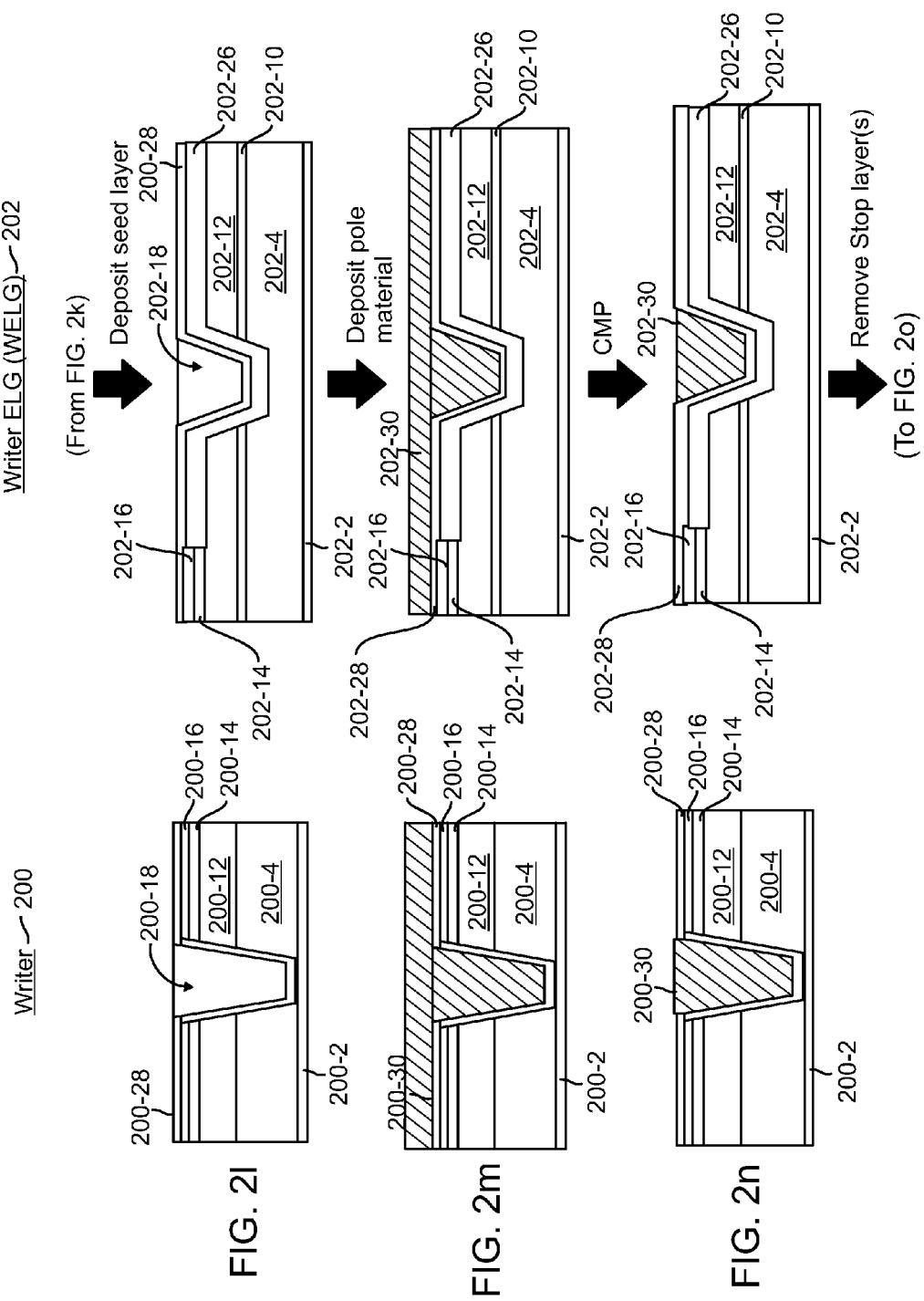

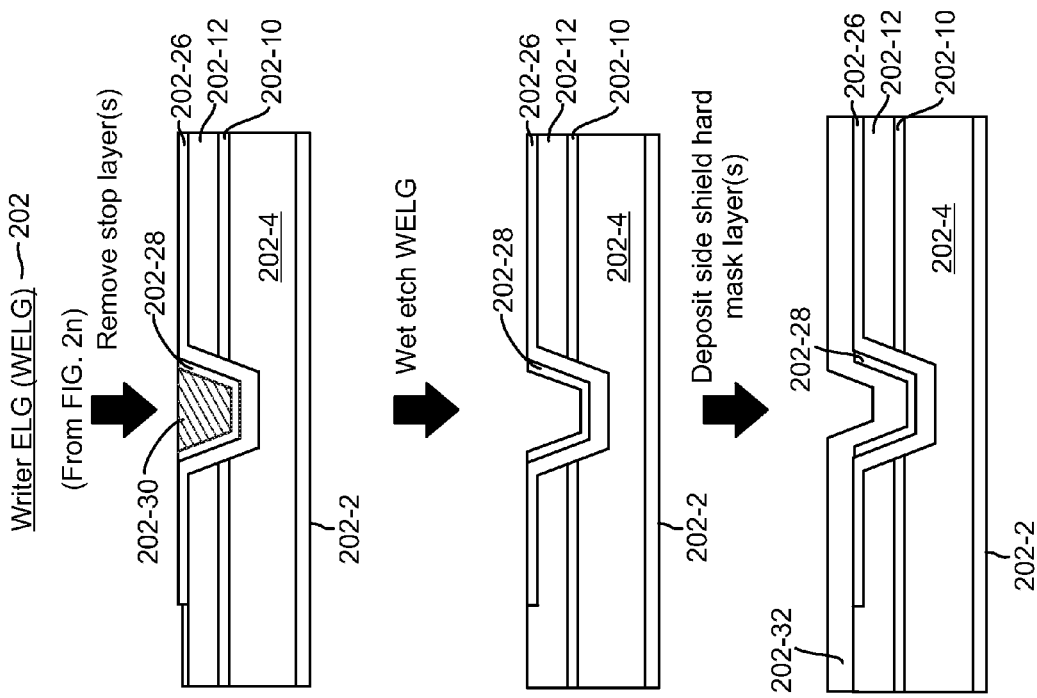
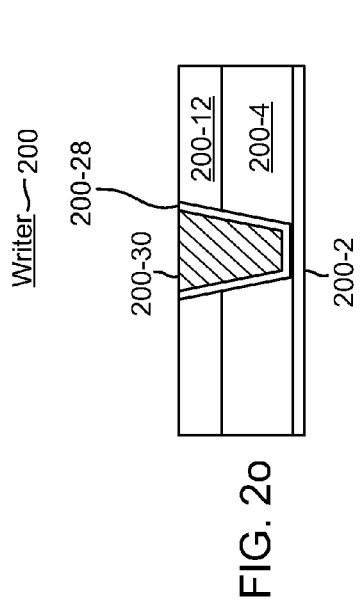
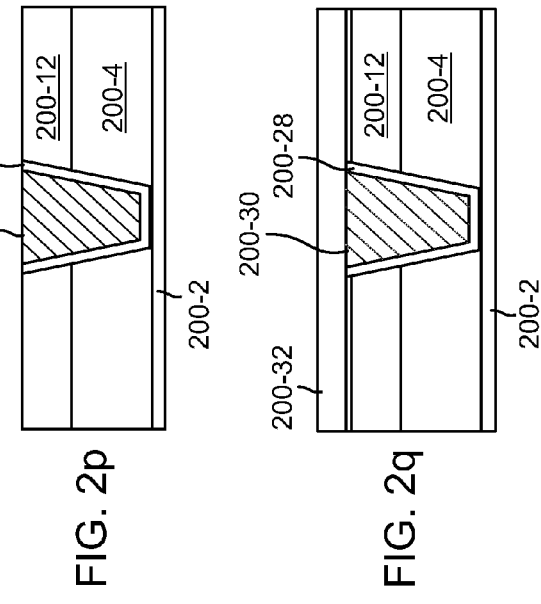
FIG. 2o
FIG. 2p
FIG. 2q

METHODS FOR MANUFACTURING ELECTRONIC LAPPING GUIDES FOR WRITER HEADS THAT CLOSELY TRACK POLE FORMATION OF THE WRITER HEADS

FIELD

The present invention relates generally to fabricating magnetic transducers, and more specifically to methods for manufacturing electronic lapping guides (ELGs) for writer heads that closely track the pole formation of the writer heads.

BACKGROUND

Conventional magnetic heads typically employ lapping to fabricate structures within the head. For example, lapping is typically used in processing a write transducer. More specifically, after pole formation, lapping may be used to remove a portion of the device to expose the air bearing surface (ABS). Lapping determines the windage, or the length measured from the ABS to the flare point of the pole of the write transducer. Similarly, lapping may be used in fabricating other structures in a head, such as the read sensor of a conventional read transducer. The dimensions of the pole and components of the read sensor can have a large effect on their performance. As such, precise control of the lapping process can be important.

In order to control lapping an electronic lapping guide (ELG) is typically used. The conventional ELG is essentially a resistive stripe coupled with leads that are used to determine the resistance of the conventional ELG. The conventional ELG has a preselected length from the surface being lapped. As lapping continues, the surface is worn away, and the length of the conventional ELG decreases, along with the resistance. Conventional ELGs are described in further detail in U.S. Pat. No. 8,151,441, entitled, "Method for providing and utilizing an electronic lapping guide in a magnetic recording transducer", the entire content of which is incorporated herein by reference.

In some related art designs, a writer ELG (WELG) is built at the bottom of a writer pole. Locating the WELG at the bottom of the writer pole has process friendly benefits that include avoiding the changes and variations from the pole fabrication process. However, such WELG placement does not simulate the pole process variation effectively and has a relatively large sigma because of side wall variations.

With the magnetic area density dramatically increasing for modern designs, the size of the writer pole is getting smaller and smaller. The yield loss on such high area density magnetic heads is mainly caused by deficiencies in magnetic write width (MWW). As such, it would be desirable to reduce MWW sigma to improve overall yield and reduce the manufacture costs.

SUMMARY

Aspects of the invention relate to methods for manufacturing electronic lapping guides (ELGs) for writer heads that closely track the pole formation of the writer heads. In one embodiment, the invention relates to a method for manufacturing a writer head using an electronic lapping guide (ELG), the method including depositing and patterning a conductive layer on a portion of a substrate to form a first connection pad at the ELG, where the ELG is adjacent to the writer head, depositing and patterning a stop layer on a portion of the substrate at the writer head, depositing a first dielectric layer on the stop layer and on the first ELG connection pad, performing a first material removal sub-process to remove a portion of the first dielectric layer to expose the first ELG connection pad, performing a planarization sub-process to substantially planarize the first dielectric layer, depositing an ELG sensor layer on a portion of the first dielectric layer at the ELG and on the first ELG connection pad, depositing a second dielectric layer on the first dielectric layer at the writer head and on the ELG sensor layer at the ELG, performing a second material removal sub-process to form a pole trench in the first and second dielectric layers extending to the stop layer at the writer head and to form an ELG trench in the second dielectric layer extending to the ELG sensor layer at the ELG, where the ELG trench is patterned to form an island structure substantially enclosing a preselected portion of the second dielectric layer, depositing a pole material within the pole trench and the ELG trench to form a write pole of the writer head, lapping the pole material, measuring a resistance of the ELG during the lapping, comparing the measured resistance with a target resistance, and terminating the lapping based on the comparison of the measured resistance with the target resistance.

BRIEF DESCRIPTION OF THE DRAWINGS

FIGS. 2a-2q illustrate a sequence of views of a writer and a writer electronic lapping guide (WELG) in a process for manufacturing the WELG that closely tracks the pole formation of the writer in accordance with one embodiment of the invention.

DETAILED DESCRIPTION

Figure 1:
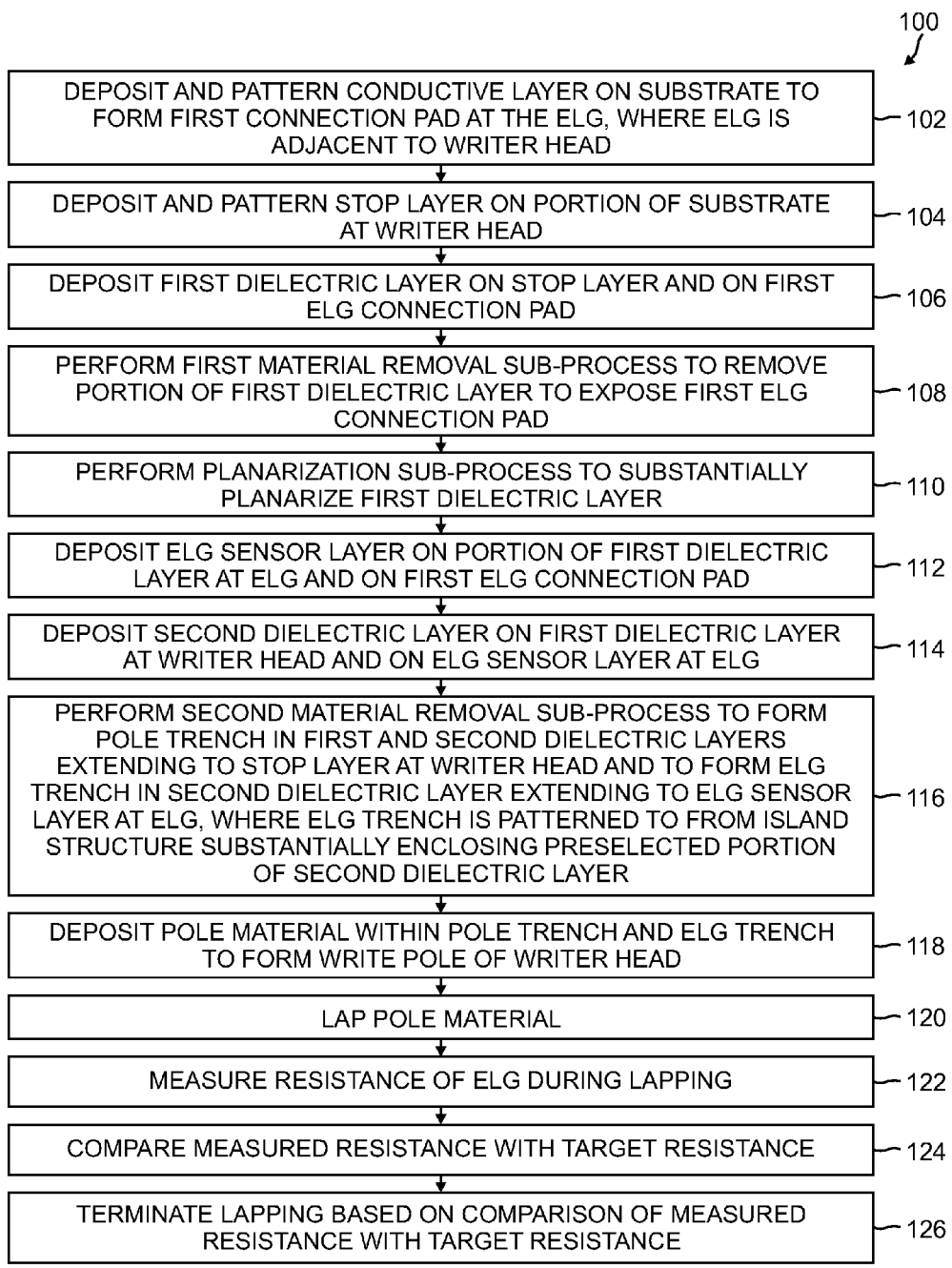
FIG. 1 is a flowchart of a process for manufacturing an electronic lapping guide (ELG) sensor for a writer head that closely tracks the pole formation of the writer head in accordance with one embodiment of the invention.

Referring now to the drawings, embodiments of methods for manufacturing electronic lapping guides (ELGs) for writer heads that closely track the pole formation of the writer heads are illustrated. In several embodiments, the methods may involve positioning a writer ELG (WELG) as close as possible to a writer pole gap position so that the WELG will be forced to adapt to substantially all process changes associated with the pole of the writer head. The methods can involve exposing a connection pad of a writer ELG adjacent to a writer, depositing an ELG sensor layer on the connection pad and along a portion of the writer ELG, depositing a dielectric layer on the writer and writer ELG, removing a portion of the dielectric layer at the writer to form a pole trench and at the writer ELG to form an ELG trench, where the ELG trench is patterned to form an island structure substantially enclosing a preselected portion of the dielectric layer, and depositing a pole material within the pole trench and ELG trench. In such case, the methods can effectively position the WELG in the writer pole gap position and subject it to substantially the same processing conditions experienced by the writer.

The methods can further involve lapping the pole material, measuring a resistance of the WELG during the lapping, comparing the measured resistance with a target resistance, and terminating the lapping based on the comparison of the measured resistance with the target resistance. In several embodiments, the methods provide improved WELGs that are substantially more accurate than conventional WELGs and the corresponding fabrication processes. In such case, the methods improve the precision of the writer pole dimensions and consequently the writer head performance. The improved writer head performance can include performance characteristics such as reduced magnetic write width (MWW).

FIG. 1 is a flowchart of a process 100 for manufacturing an electronic lapping guide (ELG) sensor for a writer head that closely tracks the pole formation of the writer head in accordance with one embodiment of the invention. The process first deposits and patterns (102) a conductive layer (e.g., leading bevel layer) on a portion of a substrate to form a first connection pad at the ELG, where the ELG is adjacent to the writer head. In several embodiments, the leading bevel layer is formed of a conductive material such as NiFe, CoFe or another suitable electrically conductive material. In several embodiments, the first connection pad is a sub-component of the ELG that forms, or is electrically coupled to, an ELG terminal that is used to take resistance measurements across the ELG when it is fully formed. In a number of embodiments, the deposition and patterning of the leading bevel layer is restricted to a preselected area of the substrate that is designated for the ELG connection pad. In one embodiment, the substrate includes a leading shield layer of the writer head.

The process then deposits and patterns (104) a stop layer on a portion of the substrate at the writer head. In one embodiment, the stop layer is configured as an etch stop layer and is made of Ru or another suitable material. The process deposits (106) a first dielectric layer on the stop layer and on the first ELG connection pad. In one embodiment, the first dielectric layer is made of Al2O3 or another suitable dielectric material. In some embodiments, the process also deposits and patterns a planarization stop layer on portions of the first dielectric layer.

The process performs (108) a first material removal sub-process to remove a portion of the first dielectric layer to expose the first ELG connection pad. In one embodiment, the first material removal sub-process is a wet etch process. In other embodiments, other suitable material removal processes can be used. In one embodiment, the first material removal sub-process forms a connection pad trench in the first dielectric layer that extends to the first ELG connection pad.

The process performs (110) a planarization sub-process to substantially planarize the first dielectric layer. In several embodiments, the planarization sub-process is a chemical mechanical polishing (CMP) process. In some embodiments, the process removes a planarization stop layer, if previously deposited, from portions of the first dielectric layer. The process deposits (112) an ELG sensor layer on a portion of the first dielectric layer at the ELG and on the first ELG connection pad. In one embodiment, the ELG sensor layer is made of TaRuTa and/or other suitable materials. The process deposits (114) a second dielectric layer on the first dielectric layer at the writer head and on the ELG sensor layer at the ELG.

The process performs (116) a second material removal sub-process to form a pole trench in the first and second dielectric layers extending to the stop layer at the writer head, and to form an ELG trench in the second dielectric layer extending to the ELG sensor layer at the ELG, where the ELG trench is patterned to form an island structure substantially enclosing a preselected portion of the second dielectric layer. The island structure in the second dielectric layer can help avoid protrusions that form along the edges of the ELG trench and cause problems during subsequent planarization sub-processes. In one embodiment, the second material removal sub-process is a reactive ion etching (RIE) process. In some embodiments, the process performs a third material removal sub-process (e.g., ion beam etching (IBE) or the like) to remove the portion of the ELG sensor layer positioned in the ELG trench. In several embodiments, an edge portion of the island structure can substantially define the preselected resistance of the ELG by defining a stripe height of a resistive stripe closest to the surface of the writer head to be lapped (e.g., the lapping surface).

The process deposits (118) a pole material within the pole trench and the ELG trench to form a write pole of the writer head. In one embodiment, the process deposits a seed layer within the pole trench and ELG trench prior to depositing the pole material. In several embodiments, the process performs a planarization sub-process (e.g., CMP) after depositing the pole material. In several embodiments, the process performs additional sub-processes known in the art for completing the fabrication process of the writing head (e.g., ELG etch, side shield formation, etc.). In one embodiment, blocks 102 to 118 of process 100 involve fabrication of the ELG and writer head while the subsequent blocks involve operation of the ELG and further fabrication of the writer head.

The process laps (120) the pole material. In several embodiments, the process laps the pole material of the writer head to have a preselected dimension. In such case, the precision with which the process can achieve the preselected dimension, based on the accuracy of the ELG, can be a key factor in the writer head performance. The process measures (122) a resistance of the ELG during the lapping. More specifically, in several embodiments, the process measures a resistance across the first ELG connection pad and a second ELG connection pad, where the ELG sensor layer is electrically coupled to both the first ELG connection pad and the second ELG connection pad. In such case, the second ELG connection pad can be fabricated in substantially the same way, and at substantially the same time, as the first ELG connection pad.

The process compares (124) the measured resistance with a target resistance. The process terminates (126) the lapping based on the comparison of the measured resistance with the target resistance. In several embodiments, the writer head and writer ELG are subjected to substantially the same processing actions during the fabrication portion of the process.

In one embodiment, the process can perform the sequence of actions in a different order. In another embodiment, the process can skip one or more of the actions. In other embodiments, one or more of the actions are performed simultaneously. In some embodiments, additional actions can be performed.

FIGS. 2a-2q illustrate a sequence of views of a writer and a writer electronic lapping guide (WELG) in a process for manufacturing the WELG that closely tracks the pole formation of the writer in accordance with one embodiment of the invention. In particular embodiments, the process can be used in conjunction with the process of FIG. 1 described above, and specifically in conjunction with blocks 102 to 118 of FIG. 1 involving the fabrication of the writer ELG.

FIG. 2a illustrates side views of various portions of a common work piece that include a writer head area ("Writer") 200, a writer ELG or WELG 202, and a WELG connection pad 204. In FIG. 2a, the writer head 200 has an etch stop layer 200-2 for the base layer, a first dielectric layer 200-4 on the etch stop layer 200-2, and a CMP stop layer 200-6 on portions of the first dielectric layer 200-4. The WELG 202 has a base layer 202-2, the first dielectric layer 202-4 on the base layer 202-2, and the CMP stop layer 202-6 on the first dielectric layer 202-4. The WELG connection pad 204 has a conductive layer (e.g., leading bevel layer) 204-2 at a base level, the first dielectric layer 204-4 on the leading bevel layer 204-2, and the CMP stop layer 204-6 on portions of the first dielectric layer 204-4.

As illustrated in FIG. 2a, the process has deposited and patterned the leading bevel layer 204-2 to have the illustrated shape at the WELG connection pad 204. The process has also deposited and patterned the etch stop layer 200-2 to have the illustrated shape at the writer 200. The process also deposited the first dielectric layer (200-4, 202-4, 204-4) on the etch stop layer 200-2 at the writer 200, on the base layer 202-2 at the WELG 202, and on the leading bevel layer 204-2 at the WELG connection pad 204. The process has deposited and patterned the CMP stop layer 204-6 on portions of the first dielectric layer (200-4, 202-4, 204-4) for each of the writer 200, the WELG 202, and the WELG connection pad 204.

In one embodiment, the etch stop layer 200-2 can be made of Ru or another suitable material. In one embodiment, the leading bevel layer 204-2 is made of a conductive material such as NiFe, CoFe and/or another suitable electrically conductive material. In one embodiment, the CMP stop layer 200-6 can be made of C or another suitable material. In one embodiment, the base layer 202-2 can be made of Al or another suitable material. The first dielectric layer (200-4, 202-4, 204-4) can be made of Al2O3 or another suitable dielectric material.

FIG. 2b illustrates side views of the various portions of the common work piece including the writer 200, the WELG 202, and the WELG connection pad 204 after the process performs a wet etch sub-process (e.g., first material removal sub-process) on the WELG connection pad 204 to remove a portion of the first dielectric layer 204-4 and thereby expose a portion of the leading bevel layer 204-2 that can function as a first ELG connection pad. The wet etch removal sub-process forms a trench 204-8 in the first dielectric layer 204-4 at the WELG connection pad 204.

FIG. 2c illustrates side views of the various portions of the common work piece including the writer 200, the WELG 202, and the WELG connection pad 204 after the process performs a chemical mechanical polishing (e.g., CMP or planarization sub-process) on the work piece to substantially planarize the first dielectric layer (200-4, 204-4) at the writer and at the WELG connection pad 204. In other embodiments, other methods of planarization can be used.

FIG. 2d illustrates side views of the various portions of the common work piece including the writer 200, the WELG 202, and the WELG connection pad 204 after the process removes the CMP stop layer (200-6, 202-6, 204-6) using a suitable stop layer removal process as is known in the art.

Figures 2E, 2F:
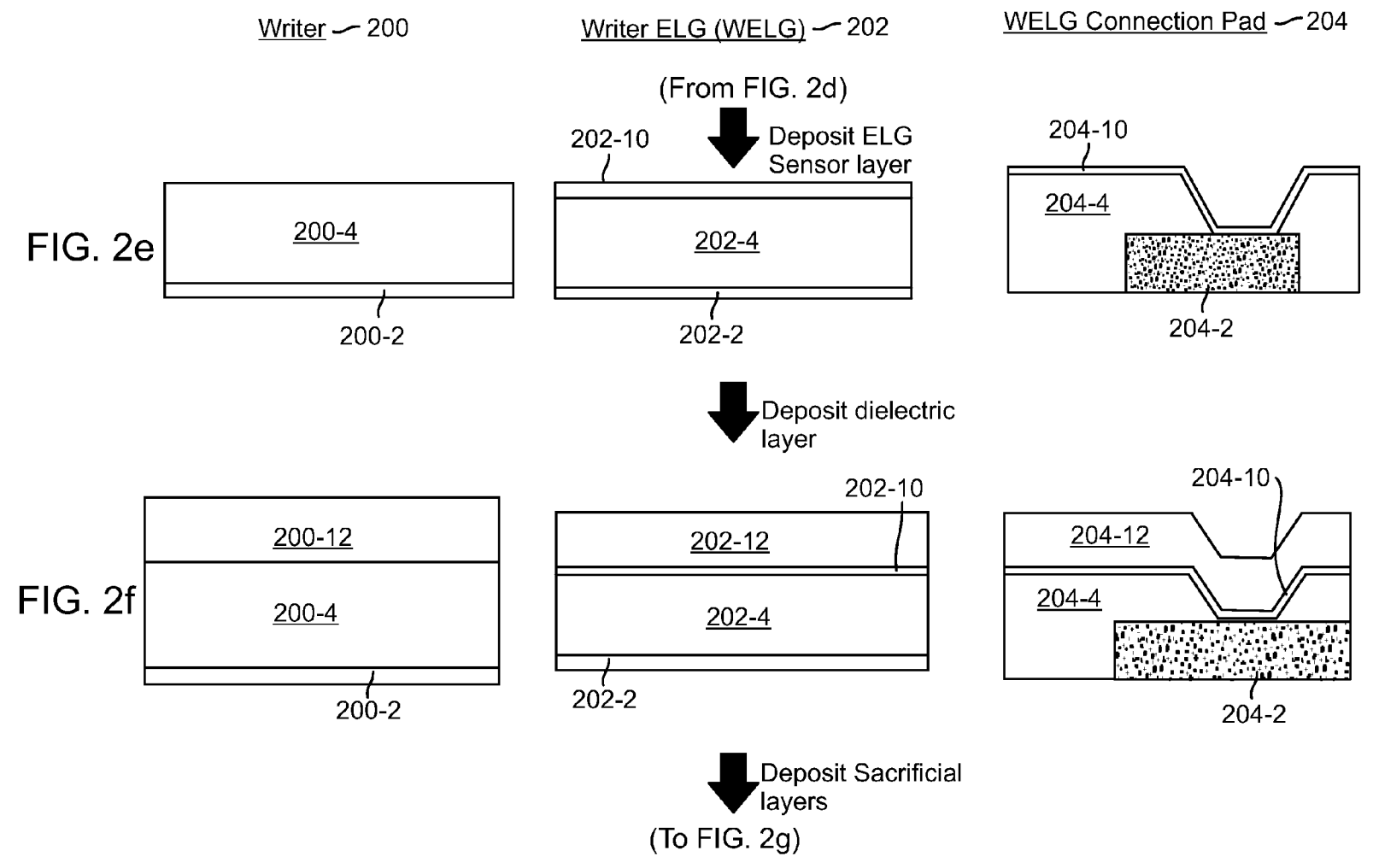

FIG. 2e illustrates side views of the various portions of the common work piece including the writer 200, the WELG 202, and the WELG connection pad 204 after the process deposits an ELG sensor layer (202-10, 204-10) on the first dielectric layer (202-4, 204-4) at the WELG 202 and at the WELG connection pad 204. In one embodiment, the ELG sensor layer (202-10, 204-10) is made of Ta, Ru, and/or other suitable materials.

FIG. 2f illustrates side views of the various portions of the common work piece including the writer 200, the WELG 202, and the WELG connection pad 204 after the process deposits a second dielectric layer (200-12, 202-12, 204-12) on the first dielectric layer 200-4 at the writer 200 and on the ELG sensor layer (202-10, 204-10) at the WELG 202 and at the WELG connection pad 204. The second dielectric layer can be made of Al2O3 or another suitable dielectric material.

FIG. 2g illustrates side views of the various portions of the common work piece including the writer 200 and the WELG 202 (now excluding the WELG connection pad) after the process deposits a first sacrificial layer (200-14, 202-14) and a second sacrificial layer (200-16, 202-16) on the second dielectric layer (200-12, 202-12). In one embodiment, the first sacrificial layer (200-14, 202-14) is made of Ta and the second sacrificial layer (200-16, 202-16) is made of Ru. In other embodiments, the first and second sacrificial layers can be made of other suitable materials known in the art.

FIG. 2h-1 illustrates side views of the various portions of the common work piece including the writer 200 and the WELG 202 after the process performs a reactive ion etching (RIE) sub-process (e.g., second material removal sub-process) on both the writer 200 and the WELG 202. At the writer 200, the RIE sub-process creates a pole trench 200-18 extending through the sacrificial layers (200-14, 200-16) and both the second dielectric layer (200-12) and the first dielectric layer (200-4) while stopping at the etch stop layer 200-2. At the WELG 202, the RIE sub-process creates an ELG trench 202-18 extending through the sacrificial layers (202-14, 202-16) and the second dielectric layer (202-12) while stopping at the ELG sensor layer 202-10. The ELG trench 202-18 is patterned to form an island structure (not visible in FIG. 2h-1 but see FIG. 2h-2) that encloses or substantially encloses a preselected portion of the second dielectric layer 202-12. The pole trench 200-18 will be used to form the pole for the writer 200. Note that the positioning of the ELG sensor layer 202-10 with respect to the writer 200 is such that a lateral projection of the ELG sensor layer 202-10 to the pole trench 200-18 of the writer head 200 is positioned in between a bottom and a top of the pole trench 200-18. Thus, the ELG sensor layer 202-10 or WELG 202 as a whole is effectively positioned within the writer gap position (e.g., pole trench 200-18) of the writer 200.

FIG. 2h-2 illustrates top views of the various portions of the common work piece including the writer 200 and the island structure 202-20 of the WELG 202 after the process has performed the reactive ion etching sub-process (e.g., second material removal sub-process) of FIG. 2h-1. The island structure 202-20 encloses a preselected portion of the second dielectric layer 202-12 to form a substantially rectangular shape. The relatively narrow width of the ELG trench 202-18 can help avoid protrusions that might otherwise form along the edges of a non-island type ELG trench (e.g., conventional ELG trench) and cause problems during subsequent planarization sub-processes.

In several embodiments, the ELG trench 202-18 of the island structure 202-20 is substantially narrower than a conventional straight non-island type ELG trench. In such case, the protrusions along the trench edges are substantially minimized, substantially reduced in size, or substantially eliminated. In subsequent processing actions, the ELG trench 202-18 can be made deeper to remove portions of the ELG sensor layer 202-10 in the ELG trench 202-18. In such case, the island structure 202-20 can form an electrical barrier in the ELG sensor layer 202-10 between first and second connection pads 204-14 such that current between the first and second connection pads 204-14 (e.g., when a voltage is applied to the connection pads) is forced to travel across the rectangular stripe 202-22 below the island structure 202-20.

The height of the rectangular stripe 202-22 may be referred to as the stripe height (SH) and can be the dominating factor in the resistance of the WELG 202 measured across the first and second connection pads 204-14. In several embodiments, the island structure of the WELG 202 contributes to defining the preselected resistance of the ELG. In particular, the placement of the lower peripheral edge portion of the rectangular shaped island structure 202-20 substantially defines the preselected resistance of the WELG 202 (e.g., since it controls the stripe height of the rectangular stripe 202-22), where the lower peripheral edge portion is the edge portion of the island structure 202-20 that is closest to the lapping surface of the writer head. As discussed above, the lapping surface of the writer 200 and WELG 202 is at the bottom of those structures as depicted in FIG. 2h-2 and the lapping removes material as the lapping surface moves in the upward direction during the lapping process.

In subsequent operation, a lapping process can be applied at the bottom of the writer 200 and the WELG 202 as depicted in FIG. 2h-2. In such case, the stripe height (SH) of the rectangular stripe 202-22 will decrease and the resistance of the WELG 202 measured across the connection pads 204-14 will increase.

In FIG. 2h-2, the writer 200 has a preselected shape defined by the pole trench 200-18. In other embodiments, the writer can have other shapes suitable to define the magnetic pole and desired pole characteristics.

FIG. 2i illustrates side views of the various portions of the common work piece including the writer 200 and the WELG 202 after the process deposits and patterns a writer mask (200-24, 202-24) on the writer 200 and on selected portions of the WELG 202. In one embodiment, the writer mask is made of a photo resist material or another suitable mask/resist material.

FIG. 2j illustrates side views of the various portions of the common work piece including the writer 200 and the WELG 202 after the process performs ion beam etching (e.g., a third material removal sub-process) to extend the depth of the ELG trench 202-18 and thereby remove the portion of the ELG sensor layer 202-10 in the ELG trench 202-18. The ion beam etching creates a gap or electrical barrier (e.g., electrical isolation) in the ELG sensor layer 202-10 at the ELG trench 202-18 as discussed above, and removes portions of the two sacrificial layers (202-14, 202-16).

FIG. 2k illustrates side views of the various portions of the common work piece including the writer 200 and the WELG 202 after the process deposits a third dielectric layer 202-26 on portions of the second dielectric layer 202-12 and the first dielectric layer 202-4 within the ELG trench 202-18. In one embodiment, the third dielectric layer is made of Al2O3 or another suitable dielectric material.

FIG. 2l illustrates side views of the various portions of the common work piece including the writer 200 and the WELG 202 after the process deposits a seed layer (200-28, 202-28) on the writer 200 and the WELG 202, and more particularly in the pole trench 200-18 and in the ELG trench 202-18. In several embodiments, the process performs a lift off sub-process prior to depositing the seed layer (200-28, 202-28), where the lift off sub-process removes the writer mask (200-24, 202-24) from the writer 200, the WELG 202, and surrounding areas. In one embodiment, the seed layer is made of Ru or another suitable material. In some embodiments, no seed layer is used.

FIG. 2m illustrates side views of the various portions of the common work piece including the writer 200 and the WELG 202 after the process deposits a pole material (200-30, 202-30) on the writer 200 and the WELG 202, and more particularly in the pole trench 200-18 and in the ELG trench 202-18. In one embodiment, the pole material includes CoFe, NiFe and/or other suitable materials.

FIG. 2n illustrates side views of the various portions of the common work piece including the writer 200 and the WELG 202 after the process performs a chemical mechanical polishing (CMP) sub-process on the writer 200 and the WELG 202 to remove excess pole material beyond the respective trenches. In other embodiments, other planarization techniques known in the art may be used.

FIG. 2o illustrates side views of the various portions of the common work piece including the writer 200 and the WELG 202 after the process removes the stop layers (e.g., 200-28, 200-16, 200-14, 202-28, 202-16, 202-14) from the writer 200 and the WELG 202. In several embodiments, any number of material removal techniques known in the art may be used.

FIG. 2p illustrates side views of the various portions of the common work piece including the writer 200 and the WELG 202 after the process performs a wet etch sub-process on the WELG 202 to remove the pole material 202-30 from the WELG 202. In other embodiments, other material removal techniques known in the art may be used.

FIG. 2q illustrates side views of the various portions of the common work piece including the writer 200 and the WELG 202 after the process deposits one or more side shield hard mask layers (200-32, 202-32) on the writer 200 and the WELG 202. In one embodiment, the side shield hard mark layers are made of Ru and/or another suitable material.

In several embodiments, the process may perform additional sub-processes known in the art for completing the fabrication process of the writing head and WELG (e.g., side shield formation, side gap formation, etc.). Once the writing head and WELG fabrication are complete, except for the lapping sub-process, the process can use the WELG to accurately lap the pole material and thereby precisely define the pole dimensions.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for manufacturing a writer head using an electronic lapping guide (ELG), the method comprising:
   depositing and patterning a conductive layer on a portion of a substrate to form a first connection pad at the ELG, wherein the ELG is adjacent to the writer head;
   depositing and patterning a stop layer on a portion of the substrate at the writer head;
   depositing a first dielectric layer on the stop layer and on the first ELG connection pad;
   performing a first material removal sub-process to remove a portion of the first dielectric layer to expose the first ELG connection pad;
   performing a planarization sub-process to substantially planarize the first dielectric layer;
   depositing an ELG sensor layer on a portion of the first dielectric layer at the ELG and on the first ELG connection pad;
   depositing a second dielectric layer on the first dielectric layer at the writer head and on the ELG sensor layer at the ELG;
   performing a second material removal sub-process to form a pole trench in the first and second dielectric layers extending to the stop layer at the writer head and to form an ELG trench in the second dielectric layer extending to the ELG sensor layer at the ELG, wherein the ELG trench is patterned to form an island structure substantially enclosing a preselected portion of the second dielectric layer;
   depositing a pole material within the pole trench and the ELG trench to form a write pole of the writer head;

lapping the pole material;
measuring a resistance of the ELG during the lapping;
comparing the measured resistance with a target resistance; and
terminating the lapping based on the comparison of the measured resistance with the target resistance.

2. The method of claim 1, wherein the performing the first material removal sub-process to remove the portion of the first dielectric layer to expose the first ELG connection pad comprises performing a wet etch sub-process to remove the portion of the first dielectric layer to expose the first ELG connection pad.

3. The method of claim 1,
wherein the performing the first material removal sub-process to remove the portion of the first dielectric layer to expose the first ELG connection pad comprises depositing and patterning a planarization stop layer on portions of the first dielectric layer and performing the first material removal sub-process to remove the portion of the first dielectric layer to expose the first ELG connection pad; and
wherein the performing the planarization sub-process to substantially planarize the first dielectric layer comprises performing the planarization sub-process to substantially planarize the first dielectric layer as far as the planarization stop layer and removing the planarization stop layer.

4. The method of claim 1, wherein the performing the first material removal sub-process to remove the portion of the first dielectric layer to expose the first ELG connection pad comprises removing the portion of the first dielectric layer to form a connection pad trench extending to the first ELG connection pad.

5. The method of claim 1, wherein a lateral projection of the ELG sensor layer to the pole trench of the writer head is positioned in between a bottom of the pole trench and a top of the pole trench.

6. The method of claim 1, wherein the lapping the pole material comprises lapping the pole material of the writer head to have a preselected dimension.

7. The method of claim 1,
wherein the depositing the pole material within the pole trench and the ELG trench to form the write pole of the writer head comprises:
depositing a seed layer within the pole trench and the ELG trench; and
depositing the pole material on the seed layer within the pole trench and the ELG trench to form the write pole of the writer head; and
wherein the lapping the pole material comprises lapping the pole material of the writer head to have a preselected dimension.

8. The method of claim 1, wherein the depositing the pole material within the pole trench and the ELG trench to form the write pole of the writer head comprises:
depositing the pole material within the pole trench and the ELG trench to form the write pole of the writer head; and
performing a planarization sub-process on the pole material.

9. The method of claim 1, wherein the performing the second material removal sub-process to form the pole trench in the first and second dielectric layers extending to the stop layer at the writer head and to form the ELG trench in the second dielectric layer extending to the ELG sensor layer at the ELG comprises performing a reactive ion etching sub-process to form the pole trench in the first and second dielectric layers extending to the stop layer at the writer head and to form the ELG trench in the second dielectric layer extending to the ELG sensor layer at the ELG.

10. The method of claim 1, wherein the writer head and the ELG are each subjected to substantially the same processing actions for fabrication.

11. The method of claim 1, wherein the measuring the resistance of the ELG during the lapping comprises measuring a resistance across the first ELG connection pad and a second ELG connection pad, wherein the ELG sensor layer is electrically coupled to both the first ELG connection pad and the second ELG connection pad.

12. The method of claim 1, wherein the performing the second material removal sub-process to form the pole trench in the first and second dielectric layers and to form the ELG trench in the second dielectric layer comprises performing a third material removal sub-process to remove a portion of the ELG sensor layer in the ELG trench.

13. The method of claim 12, wherein the third material removal sub-process comprises an ion beam etching sub-process to remove the portion of the ELG sensor layer in the ELG trench.

14. The method of claim 1, wherein the substrate comprises a leading shield layer of the writer head.

15. The method of claim 1, wherein the conductive layer comprises Cu.

16. The method of claim 1, wherein a preselected width of the ELG trench and the island structure are selected to substantially avoid a formation of protrusions along edges of the ELG trench prior to a subsequent planarization sub-process.

17. The method of claim 1, wherein the island structure is configured to define a preselected resistance of the ELG.

18. The method of claim 17, wherein a peripheral edge portion of the island structure is configured to substantially define the preselected resistance of the ELG, wherein the peripheral edge portion is an edge portion of the island structure that is closest to a lapping surface of the writer head.

* * * * *